March 20, 1951     G. N. CADE     2,545,875
SULFURIZED LUBRICANT
Filed Aug. 2, 1948
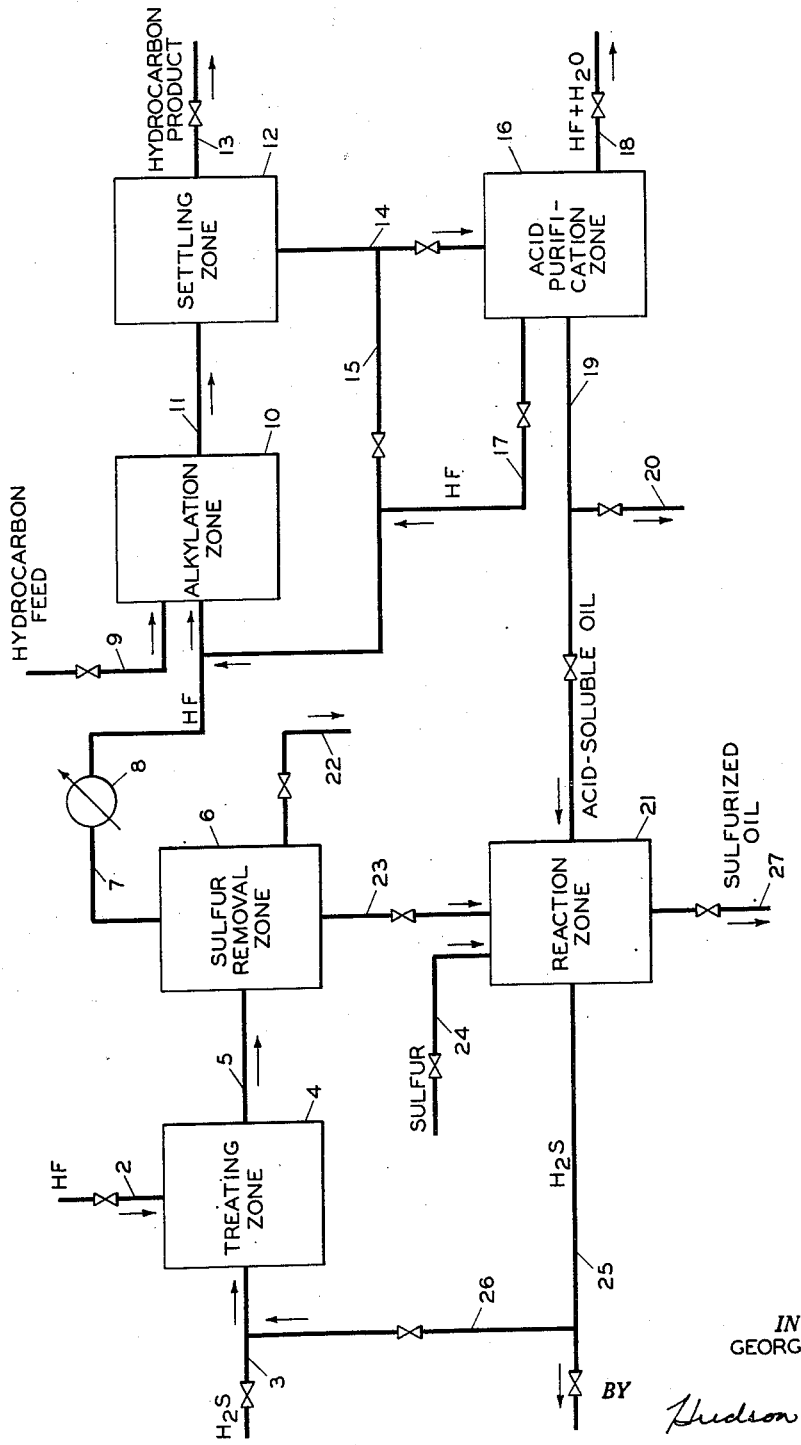
INVENTOR.
GEORGE N. CADE
BY *Hudson and Young*
ATTORNEYS Patented Mar. 20, 1951

2,545,875

UNITED STATES PATENT OFFICE 2,545,875

SULFURIZED LUBRICANT

George N. Cade, Bartlesville, Okla., assignor to Phillips Petroleum Company, a corporation of Delaware Application August 2, 1948, Serial No. 42,077

8 Claims. (Cl. 260—139)

This invention relates to the production of lubricant additives. More particularly, it relates to the production of additives that increase the film strength of lubricating oils. In a more specific aspect, it relates to the conversion of a waste by-product into an additive for lubricating oils, cutting oils, and the like.

In the production of hydrocarbon fuels for internal combustion engines by the alkylation of paraffins with olefins in the presence of liquid alkylation catalysts, the catalysts gradually become diluted with comparatively high-boiling organic acid-soluble by-products. When other hydrocarbon conversions, such as isomerization and disproportionation of paraffins, are conducted in the presence of liquid alkylation or Friedel-Crafts type catalysts, the catalysts gradually become diluted and deactivated with organic by-products similar to those obtained in alkylation. These by-products must be removed from the catalyst in order to maintain a desirably high degree of catalyst activity. Several different methods, depending on the specific catalyst used, are practiced for removing these catalyst-soluble by-products. Dilution of the catalyst with water, hydrolysis, and fractional distillation are among those most frequently used. The removed catalyst-soluble by-products are customarily discarded.

In accordance with this invention, catalyst-soluble by-products of the type previously mentioned are converted to useful materials by reaction with elemental sulfur at elevated temperatures. The sulfurized products obtained are useful as additives for lubricating oils, cutting oils, and the like. When blended with mineral lubricating oil they increase the film strength of the oil.

The organic by-products sulfurized in accordance with this invention are obtained as undesired catalyst diluents when hydrocarbon conversions, such as paraffin-olefin alkylation, are conducted in the presence of liquid catalysts such as concentrated hydrofluoric acid, concentrated sulfuric acid, concentrated phosphoric acid, halosulfonic acids, mixtures of the acids mentioned, and aluminum halide-hydrocarbon complexes. These catalysts are sometimes promoted with such materials as hydrogen halides, free halogens, and boron fluoride.

The preferred material to be sulfurized in accordance with this invention is the catalyst-soluble diluent obtained as a by-product of hydrocarbon conversions catalyzed by concentrated or anhydrous hydrofluoric acid. This particular material is preferred because it is readily recoverable by fractional distillation of the used catalyst. This material is commonly termed "acid-soluble oil." It is to be understood, however, that the catalyst-soluble diluents or oils recoverable from other catalysts of the type previously discussed may be used within the broadest scope of this invention.

The following properties are given as more or less typical of the acid-soluble oil produced when isobutane is alkylated at about 100° F. with refinery olefins, mainly butenes, in the presence of hydrofluoric acid having a titratable acidity of about 85 to 90 weight per cent:

| | |
|---|---|
| A. P. I. gravity | 15–30° |
| Iodine number | 110–260 |
| Fluorine, weight per cent | 2 |
| Sulfur, weight per cent | 1 |
| Total solids, weight per cent | 35–80 |
| Viscosity at 210° F., S. U. S. | 60–300 |
| Aniline point, °F. | 122–212 |
| Flash point, °F., C. O. C. | 190–230 |
| Fire point, °F., C. O. C. | 220–240 |
| Pour point, °F. | 5–80 |
| A. S. T. M. distillation (vacuum), volume per cent distilled, °F. (corr.): | |
| First drop | 220 |
| 10 | 546 |
| 50 | 627 |
| 70 (oil cracked) | 640 |
| Viscosity index of a fraction boiling above 574° F. (corr.) | −61 |

As indicated in the preceding tabulation, some of the properties vary from sample to sample, depending on specific conditions of acid fractionation, feed composition, etc.

The catalyst-soluble oil is preferably reacted with sulfur at about 180 to 400° F. for 1 to 10 hours. The reaction mixture is preferably constantly stirred or otherwise agitated. The sulfur is preferably used in the finely divided solid or in the molten state. The amount of sulfur added is approximately 5 to 50 weight per cent, preferably 20 to 40 weight per cent, of the catalyst-soluble oil. The reaction product is stripped with steam, nitrogen, methane, or other inert gas to remove hydrogen sulfide formed. The stripping gas may be continuously contacted with the oil and the sulfur during the reaction. In some cases, the reaction may be promoted with small amounts of sulfur halides. The sulfurized product contains from 5 to 35 weight per cent of combined sulfur. The exact percentage of combined sulfur in the product will depend upon several factors, such as the amount of sulfur added, temperature employed, etc.

The accompanying drawing illustrates one method for practicing the invention in connection with a process for alkylating an isoparaffin with one or more olefins in the presence of concentrated hydrofluoric acid. Commercial hydrofluoric acid containing small but undesirable amounts of sulfur dioxide enters treating zone 4 through inlet 2. Hydrogen sulfide enters the treating zone through inlet 3. In treating zone 4, the hydrogen sulfide reacts with the sulfur dioxide in accordance with the equation

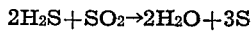

$$2H_2S + SO_2 \rightarrow 2H_2O + 3S$$

The molecular proportions of hydrogen sulfide and sulfur dioxide charged to treating zone 4 are approximately those indicated by this equation. The resulting mixture of hydrofluoric acid, water, and sulfur is passed through conduit 5 to sulfur removal zone 6.

Sulfur removal zone 6 comprises one or more fractional distillation or flashing steps. A major fraction comprising chiefly hydrofluoric acid substantially free from sulfur compounds and water is removed through conduit 7, condensed in condenser 8, and passed to alkylation zone 10. A fraction comprising an azeotropic mixture of water and hydrofluoric acid is withdrawn from the system through outlet 22. A residue comprising elemental sulfur is passed through conduit 23 to reaction zone 21. In some cases, particularly when the amount of sulfur dioxide in the hydrofluoric acid is unusually low, the recovery of the sulfur formed may be uneconomical. In such a case, the valve in conduit 23 is closed, and the sulfur formed in treating zone 4 is withdrawn through conduit 22 together with the aqueous hydrofluoric acid. The removal of sulfur dioxide by reaction with hydrogen sulfide is disclosed and claimed by M. P. Matuszak in U. S. Patent 2,414,884, granted January 28, 1947.

In alkylation zone 10, the hydrofluoric acid entering through conduit 7 is intimately mixed with hydrocarbon feed, which enters through conduit 9. The hydrocarbon feed comprises, for example, at least one olefin having at least three carbon atoms per molecule and at least a fourfold molar excess (based on total olefins) of isoparaffin. Alkylation conditions maintained in alkylation zone 10 are those well known in the art for alkylating isoparaffins with olefins in the presence of hydrofluoric acid, and no detailed discussion of these conditions is deemed necessary in this application.

The alkylation effluent passes through conduit 11 to settling zone 12, in which the acid and the hydrocarbon phase separate. The hydrocarbon phase is withdrawn through conduit 13 to a fractional distillation and alkylate recovery system not shown. The acid phase is recycled in part through conduits 14 and 15 to alkylation zone 10. The remainder passes through conduit 14 to acid purification zone 16 for removal of undesired impurities.

Acid purification zone 16 ordinarily comprises at least one fractional distillation step and usually at least two. A major fraction comprising purified hydrofluoric acid is withdrawn through conduit 17 and recycled through conduit 15 to alkylation zone 10. A fraction comprising an azeotropic mixture of water and hydrofluoric acid is withdrawn from the system through conduit 18. A heavy, acid-soluble oil is withdrawn, as a distillation residue, through conduit 19. It has been customary in the past to discard the acid-soluble oil, as through outlet 20, but it is with this acid-soluble oil that the present invention is primarily concerned.

In accordance with this invention, the acid-soluble oil is passed, at least in part, through conduit 19 to reaction zone 21. Sulfur recovered in sulfur removal zone 6 enters reaction zone 21 through conduit 23. Additional sulfur is added, as needed, through inlet 24. The acid-soluble oil and the sulfur are thoroughly mixed and heated in reaction zone 21 under conditions disclosed hereinbefore. The sulfurized oil produced in reaction zone 21 by the reaction of sulfur with the acid-soluble oil is withdrawn through outlet 27. This reaction produces hydrogen sulfide as a by-product. The hydrogen sulfide may be withdrawn through outlet 25, but is preferably recycled, at least in part, to treating zone 4 through conduit 26. Since the hydrogen sulfide is produced in comparatively high concentration in reaction zone 21, it is advantageously utilized in treating zone 4 to remove sulfur dioxide from the influent commercial hydrofluoric acid. Any additional hydrogen sulfide needed is added through inlet 3 from an outside source not shown.

The sulfurized oil withdrawn through outlet 27 may be blended with a mineral lubricating oil to obtain a product lubricant having increased film strength and extreme pressure properties. The proportion of sulfurized oil added is sufficient to obtain a product oil containing about 1 to 10 weight per cent of the sulfurized oil.

Example

An acid-soluble oil recovered by distillation of hydrofluoric acid catalyst from an alkylation system in which isobutane was alkylated with butenes was reacted with finely divided elemental sulfur at 194–212° F. for 5 hours. Thirty-three grams of the acid-soluble oil and 11 grams of sulfur were used, and the mixture was continually stirred. After the 5-hour reaction period, methane was passed through the mixture at the reaction temperature for 2 hours to remove hydrogen sulfide.

The sulfurized oil obtained was blended with an S. A. E. 40 motor oil to obtain a product oil containing 1.0 weight per cent of the sulfurized additive oil. The additive-containing oil and the additive-free S. A. E. 40 oil were tested for film strength on an Almen testing machine. The oil containing the sulfurized acid-soluble oil was found to have higher film strength than the additive-free oil.

Higher proportions (e. g. 2 to 5 weight per cent) of the sulfurized acid-soluble oil further improve the extreme pressure properties of the S. A. E. 40 oil.

I claim:

1. A method for preparing an additive for lubricating oils, which comprises reacting in a reaction zone a hydrofluoric acid-soluble oil with from 5 to 50 weight per cent of elemental sulfur based on said hydrofluoric acid-soluble oil, said hydrofluoric acid-soluble oil being obtained from an alkylation process wherein an alkylatable paraffin is alkylated with an olefin in the presence of hydrofluoric acid as a catalyst, maintaining a temperature in said reaction zone in the range between 180–400° F. for a period of time in the range of from one to ten hours, and recovering a resulting sulfurized oil capable of imparting improved extreme pressure characteristics to lubricating oils when blended therewith.

2. A method which comprises reacting in a reaction zone a catalyst-soluble oil with from 5 to 50 weight per cent of elemental sulfur based on said catalyst-soluble oil, said catalyst-soluble oil being obtained from a catalytic alkylation process wherein an alkylatable paraffin is caused to react with an olefin in the presence of an alkylation catalyst selected from the group consisting of sulfuric acid, hydrofluoric acid, phosphoric acid, and an aluminum halide-hydrocarbon complex, maintaining a temperature in said reaction zone in the range of 180-400° F. for a period of time in the range of one to ten hours, and recovering a resulting sulfurized oil as a product of the process.

3. A process for preparing an additive for lubricating oils, which comprises reacting in a reaction zone a sulfuric acid-soluble oil with from 5 to 50 weight per cent of elemental sulfur based on said sulfuric acid-soluble oil, said sulfuric acid-soluble oil being obtained from an alkylation process wherein an alkylatable paraffin is alkylated with an olefin in the presence of sulfuric acid as a catalyst, maintaining a temperature in said reaction zone in the range between 180-400° F. for a period of time in the range of from one to ten hours, and recovering a resulting sulfurized oil capable of imparting improved extreme pressure characteristics to lubricating oils when blended therewith.

4. In a process for preparing an additive for lubricating oils, which comprises reacting in a reaction zone an aluminum halide-hydrocarbon complex-soluble oil with from 5 to 50 weight per cent of elemental sulfur based on said aluminum halide-hydrocarbon complex-soluble oil, said aluminum halide-hydrocarbon complex-soluble oil being obtained by the hydrolysis of an aluminum halide-hydrocarbon complex that has been used to catalyze an alkylation process wherein an alkylatable paraffin is alkylated with an olefin, maintaining a temperature in said reaction zone in the range between 180-400° F. for a period of time in the range of from one to ten hours, and recovering a resulting sulfurized oil capable of imparting improved extreme pressure characteristics to lubricating oils when blended therewith.

5. A process for preparing an additive for lubricating oils, which comprises reacting in a reaction zone a hydrofluoric acid-soluble oil with elemental sulfur, said hydrofluoric acid-soluble oil being obtained from an alkylation process wherein an alkylatable paraffin is alkylated with an olefin in the presence of hydrofluoric acid as a catalyst, maintaining a temperature in said reaction zone in the range of 180-400° F. thereby producing a sulfurized oil and hydrogen sulfide, treating the fresh hydrofluoric acid alkylation catalyst with at least a portion of said hydrogen sulfide to reduce the sulfur dioxide contained in said hydrofluoric acid catalyst to elemental sulfur, and reacting said elemental sulfur with said hydrofluoric acid-soluble oil.

6. A process for preparing an additive for lubricating oils, which comprises reacting in a reaction zone a hydrofluoric acid-soluble oil with elemental sulfur, said hydrofluoric acid-soluble oil being obtained as a kettle product when hydrofluoric acid that has been used to catalyze the alkylation of an alkylatable paraffin is purified by distillation, maintaining a temperature in said reaction zone in the range of 180-400° F. thereby producing a sulfurized oil and hydrogen sulfide, and treating the fresh hydrofluoric acid alkylation catalyst with at least a portion of said hydrogen sulfide to reduce the sulfur dioxide contained in said hydrofluoric acid catalyst to elemental sulfur.

7. A method for preparing an additive for lubricating oils, which comprises reacting in a reaction zone a hydrofluoric acid-soluble oil with from 5 to 50 weight per cent of elemental sulfur based on said hydrofluoric acid-soluble oil, said hydrofluoric acid-soluble oil being obtained from an alkylation process wherein isobutane is alkylated with butene in the presence of concentrated hydrofluoric acid, said hydrofluoric acid-soluble oil possessing the following properties:

| | |
|---|---|
| Gravity, A. P. I.° | 15-30 |
| Iodine number | 110-260 |
| Aniline point, °F | 122-212 |
| A. S. T. M. distillation (vacuum), volume per cent distilled, °F. (corrected): | |
| First drop | 220 |
| 10 | 546 |
| 50 | 627 |
| 70 (oil cracked) | 640 | maintaining a temperature in said reaction zone in the range from 180-400° F. for a period of time in the range of from one to ten hours, and recovering a resulting sulfurized oil as a product of the process.

8. A process for simultaneously producing a paraffinic hydrocarbon material useful as an ingredient for motor fuel and a lubricating oil additive, which comprises reacting isobutane with butenes in the presence of hydrofluoric acid catalyst in an alkylation zone maintained at reaction conditions, separating the effluent reaction mixture from said alkylation zone into an acid phase and a hydrocarbon phase, recovering from said acid phase an acid-soluble oil, reacting at least a portion of said acid-soluble oil in a reaction zone maintained at a temperature in the range between 180 and 400° F. with 5 to 50 weight per cent elemental sulfur based on the acid-soluble oil, thereby producing hydrogen sulfide and a sulfurized oil, treating the fresh hydrofluoric acid alkylation catalyst with at least a portion of said hydrogen sulfide, thereby converting said hydrogen sulfide and sulfur dioxide contained in said hydrofluoric acid catalyst to elemental sulfur and water, removing said elemental sulfur from the resulting reaction mixture and passing said elemental sulfur to said reaction zone.

GEORGE N. CADE.

REFERENCES CITED

The following references are of record in the file of this patent:

UNITED STATES PATENTS

| Number | Name | Date |
|---|---|---|
| 2,218,132 | Lincoln | Oct. 15, 1940 |
| 2,246,282 | Zimmer | June 17, 1941 |
| 2,312,750 | Cohen | Mar. 2, 1943 |
| 2,330,858 | Anderson | Oct. 5, 1943 |